(12) United States Patent
Pritchard et al.

(10) Patent No.: US 10,174,836 B2
(45) Date of Patent: *Jan. 8, 2019

(54) SPEED-RESPONSIVE MECHANICAL RANGE LOCK FOR A TRANSFER CASE

(71) Applicant: BorgWarner Inc., Auburn Hills, MI (US)

(72) Inventors: Larry A. Pritchard, Macomb, MI (US); Earl David Ray, White Lake, MI (US)

(73) Assignee: BorgWarner, Inc., Auburn Hills, MI (US)

(*) Notice: Subject to any disclaimer, the term of this patent is extended or adjusted under 35 U.S.C. 154(b) by 60 days.

This patent is subject to a terminal disclaimer.

(21) Appl. No.: 15/338,592

(22) Filed: Oct. 31, 2016

(65) Prior Publication Data

US 2017/0051827 A1    Feb. 23, 2017

Related U.S. Application Data

(63) Continuation of application No. 14/820,154, filed on Aug. 6, 2015, now Pat. No. 9,605,753.

(51) Int. Cl.
| | |
|---|---|
| *F16H 63/34* | (2006.01) |
| *F16H 61/18* | (2006.01) |
| *B60K 17/344* | (2006.01) |
| *F16H 37/02* | (2006.01) |
| *F16H 3/54* | (2006.01) |
| *F16H 59/40* | (2006.01) |

(52) U.S. Cl.
CPC .......... *F16H 61/18* (2013.01); *B60K 17/344* (2013.01); *F16H 37/02* (2013.01); *F16H 63/34* (2013.01); *F16H 3/54* (2013.01); *F16H 59/40* (2013.01)

(58) Field of Classification Search
CPC ...................................... F16H 63/34
See application file for complete search history.

(56) References Cited

U.S. PATENT DOCUMENTS

| | | | |
|---|---|---|---|
| 3,451,513 A * | 6/1969 | Altmann | F16D 23/06 192/107 R |
| 4,133,219 A | 1/1979 | Fujiura et al. | |
| 4,526,255 A | 7/1985 | Hennessey et al. | |
| 4,663,992 A | 5/1987 | Fujiura et al. | |
| 4,770,280 A * | 9/1988 | Frost | B60K 17/344 180/247 |
| 4,944,197 A | 7/1990 | Stine et al. | |
| 5,239,734 A | 8/1993 | Bathelier et al. | |
| 5,284,065 A | 2/1994 | Loefferl et al. | |
| 5,411,450 A | 5/1995 | Gratton et al. | |
| 5,471,893 A | 12/1995 | Newbigging | |
| 5,499,951 A | 3/1996 | Showalter | |
| 5,788,038 A | 8/1998 | Hickey et al. | |

(Continued)

*Primary Examiner* — Tisha D Lewis (57) ABSTRACT

A transfer case for a motor vehicle. An input is rotatable about an axis to receive torque, an output is rotatable about the axis to transmit torque, and a planetary gear set is rotatable about the axis and operatively coupled between the input and the output. A shift sleeve circumscribes and is axially slidably carried along the axis, and a shift sleeve lock is automatically engageable with the shift sleeve responsive to the transfer case exceeding a predetermined rotational speed, to prevent axial movement of the shift sleeve above that speed. A related method is also provided.

15 Claims, 4 Drawing Sheets

(56) References Cited

U.S. PATENT DOCUMENTS

| | | | |
|---|---|---|---|
| 5,960,670 A * | 10/1999 | Iverson | F16H 35/00 |
| | | | 180/233 |
| 8,434,608 B2 | 5/2013 | Uhl | |
| 8,452,504 B2 | 5/2013 | Dickinson et al. | |
| 8,463,167 B2 | 6/2013 | Tanaka et al. | |
| 8,635,925 B2 | 1/2014 | Gerlofs et al. | |
| 9,605,753 B2 * | 3/2017 | Pritchard | F16H 61/18 |
| 2008/0236322 A1 | 10/2008 | Jeng et al. | |
| 2009/0049940 A1 * | 2/2009 | Takaira | B60K 17/344 |
| | | | 74/395 |
| 2013/0337961 A1 | 12/2013 | Kaltenbach | |

* cited by examiner

SPEED-RESPONSIVE MECHANICAL RANGE LOCK FOR A TRANSFER CASE

TECHNICAL FIELD

The present disclosure relates generally to motor vehicle powertrains and, more particularly, to multi-speed transfer cases.

BACKGROUND

A motor vehicle powertrain includes a prime mover to generate torque, a transmission coupled to the prime mover to leverage the torque, and a drivetrain coupled to the transmission to distribute the torque to wheels of the vehicle. For example, the drivetrain of some vehicles includes a transfer case to carry out changes from a two-wheel-drive (2WD) mode to a four-wheel-drive (4WD) mode and vice versa, or changes from a high range 4WD configuration to a low range 4WD configuration and vice versa.

SUMMARY

In one embodiment a motor vehicle transfer case includes an input rotatable about an axis to receive torque, an output rotatable about the axis to transmit torque, and a planetary gear set rotatable about the axis and operatively coupled between the input and the output. The transfer case also includes a shift sleeve circumscribing and axially slidably carried along the axis, and a shift sleeve lock automatically engageable with the shift sleeve responsive to the transfer case exceeding a predetermined rotational speed, to prevent axial movement of the shift sleeve above that speed.

In another embodiment, a method of operating a transfer case includes moving a range shift sleeve to a range position coupling one rotatable component to another rotatable component, and allowing a shift sleeve lock to move radially outwardly to block axial movement of the shift sleeve, responsive to a rotational speed of the transfer case exceeding a predetermined speed.

DETAILED DESCRIPTION

The drawing figures illustrate embodiments of a transfer case 14 equipped with one or more unique and inventive arrangements of components that provide a mechanical failsafe arrangement to maintain the transfer case 14 in a desired speed range configuration when the transfer case 14 is operating above a predetermined rotational speed and thereby prevent the transfer case 14 from being shifted inadvertently out of that configuration above that speed.

Figure 1:
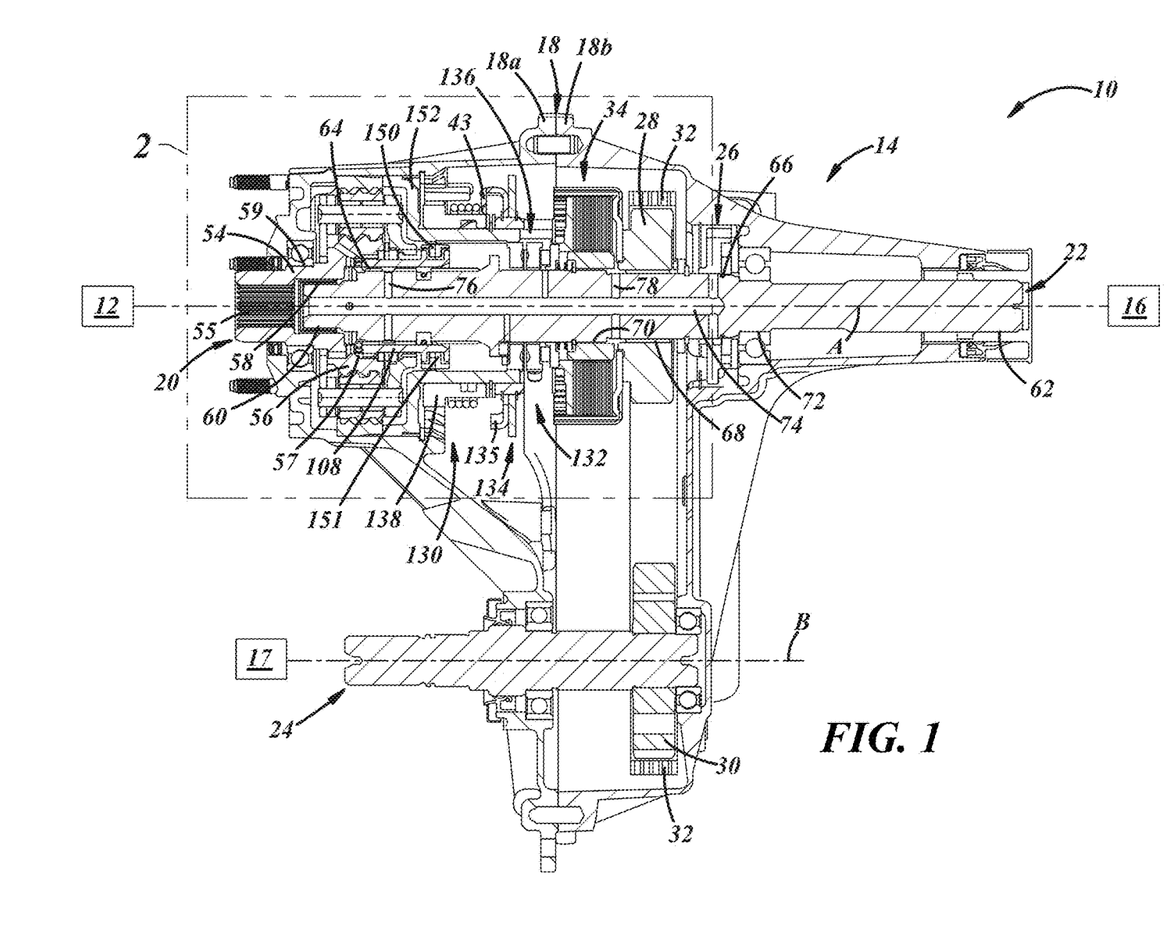
FIG. 1 is a mechanical schematic diagram of a portion of a vehicle powertrain including a fragmentary, longitudinal cross-sectional view of a transfer case of the powertrain in accord with an example embodiment of the present disclosure.

With reference to FIG. 1, in general, a motor vehicle powertrain 10 may include a transmission 12, the transfer case 14 coupled to the transmission 12, a first axle 16 coupled to the transfer case 14, and a second axle 17 coupled to the transfer case 14. Of course, although not shown, the powertrain 10 also may include other drivetrain sub-systems, a prime mover like an engine or a motor, and any other suitable powertrain elements. The transmission 12 may include a manual transmission, a multi-speed automatic transmission, a continuously/infinitely variable transmission, and/or any other suitable type of transmission to leverage torque provided to the transmission by the prime mover. Likewise, the axle(s) 16, 17 may include differentials, all-wheel-drive (AWD) couplings, or any other suitable drivetrain elements.

The transfer case 14 may carry out changes from a two-wheel-drive (2WD) mode to a four-wheel-drive (4WD) mode and vice versa, changes from a high range 4WD mode to a low range 4WD mode and vice versa, and/or any other suitable transfer case functionality. The transfer case 14 may include a housing 18 to carry various transfer case components, an input 20 rotatable about a first axis A to receive torque, a first output 22 also rotatable about the first axis A to transmit torque out of the transfer case 14, and a second output 24 rotatable about a second axis B offset from the first axis A to transmit torque out of the transfer case 14 in a direction different from that of the first output 22.

The housing 18 may include multiple housing portions, for example, first and second opposed housing portions 18a, 18b that may be coupled together via dowel pins and fasteners, or in any other suitable manner. In other embodiments, the housing 18 may be a single monolithic structure, such as a casting, to which one or more covers (not shown), such as stampings, may be attached. In any case, the housing 18 may contain oil and provide structural support for various internal components of the transfer case 14.

The transfer case 14 may include an oil pump assembly 26 that may be connected to the first output 22 to pull oil from the bottom of the housing 18 and distribute the oil to various parts of the transfer case 14. Also, the transfer case 14 may include a first sprocket 28 selectively connectable to the first output 22, a second sprocket 30 connected to the second output 24, and a chain 32 connected to the first and second sprockets 28, 30 to carry torque from the first axis A to the second axis B. Further, the transfer case 14 further may include a shiftable coupling or clutch 34 to selectively connect the first sprocket 28 to the first output 22.

Figures 1A, 3:
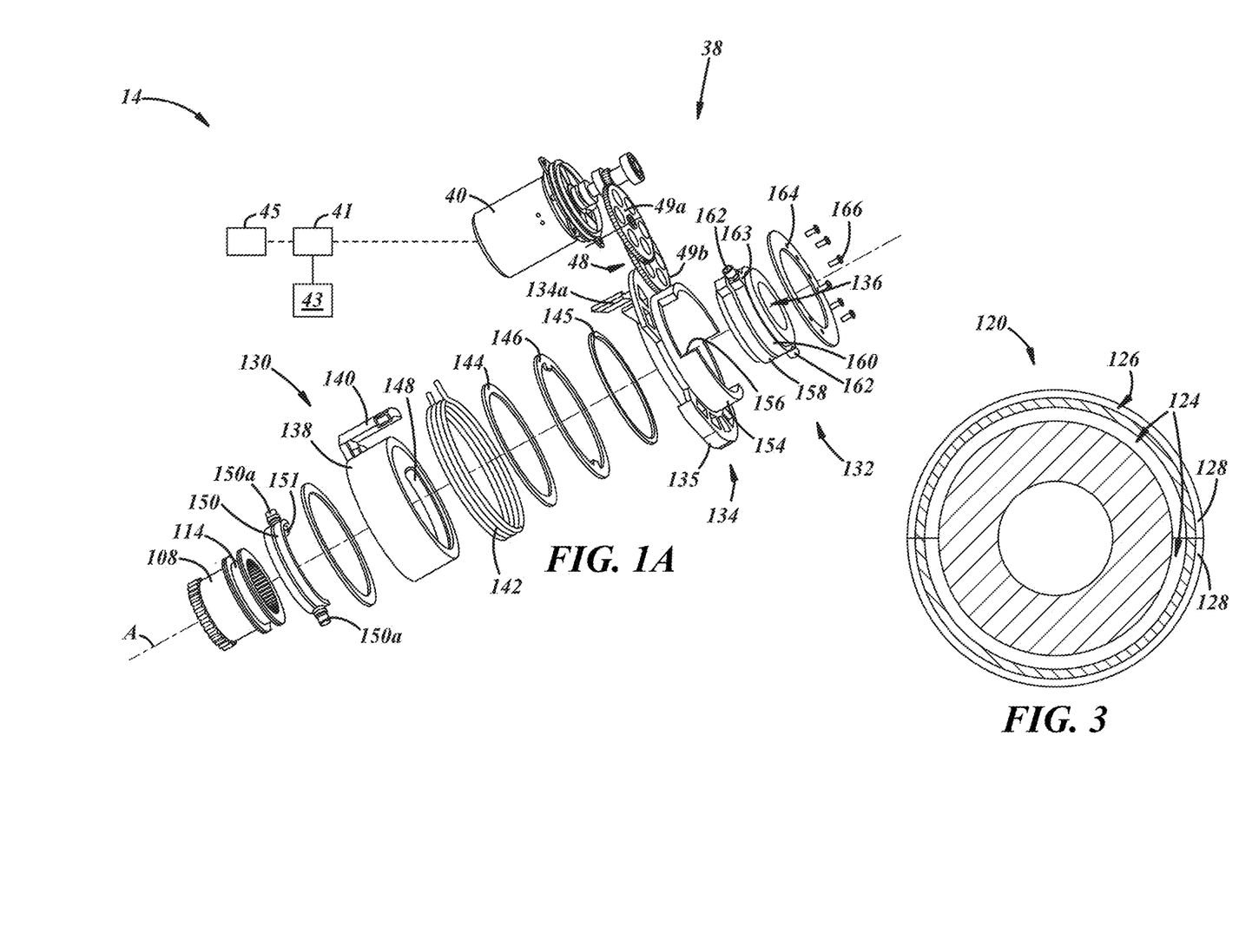
FIG. 1A is an enlarged, exploded view of a portion of the transfer case of FIG. 1.
FIG. 3 is an enlarged, transverse cross-sectional view of a speed-responsive range lock of the transfer case of FIG. 1.

Additionally, with reference to FIG. 1A, the transfer case 14 also may include a shift actuator 38 that actuates the clutch 34 (FIG. 1). The shift actuator 38 may include a reversible electric motor 40 that may be controlled in accordance with a control program stored in memory within an engine control unit (ECU) 41 in response to signals received from one or more vehicle sensors 43 and/or a range/mode selector 45. The engine control unit 41 may operate in an automatic mode automatically controlling the reversible electric motor 40, or may allow a vehicle driver to select an available drive mode and/or range in a manual mode of operation through the range/mode selector 45. The shift actuator 38 also may include a geartrain 48 that transfers drive torque from the electric motor 40 through one or more gears 49a,49b and that may be reversibly driven by the electric motor 40. As will be described in greater detail below, the shift actuator 38 may actuate mode shifts and/or range shifts of the transfer case 14.

Figure 2:
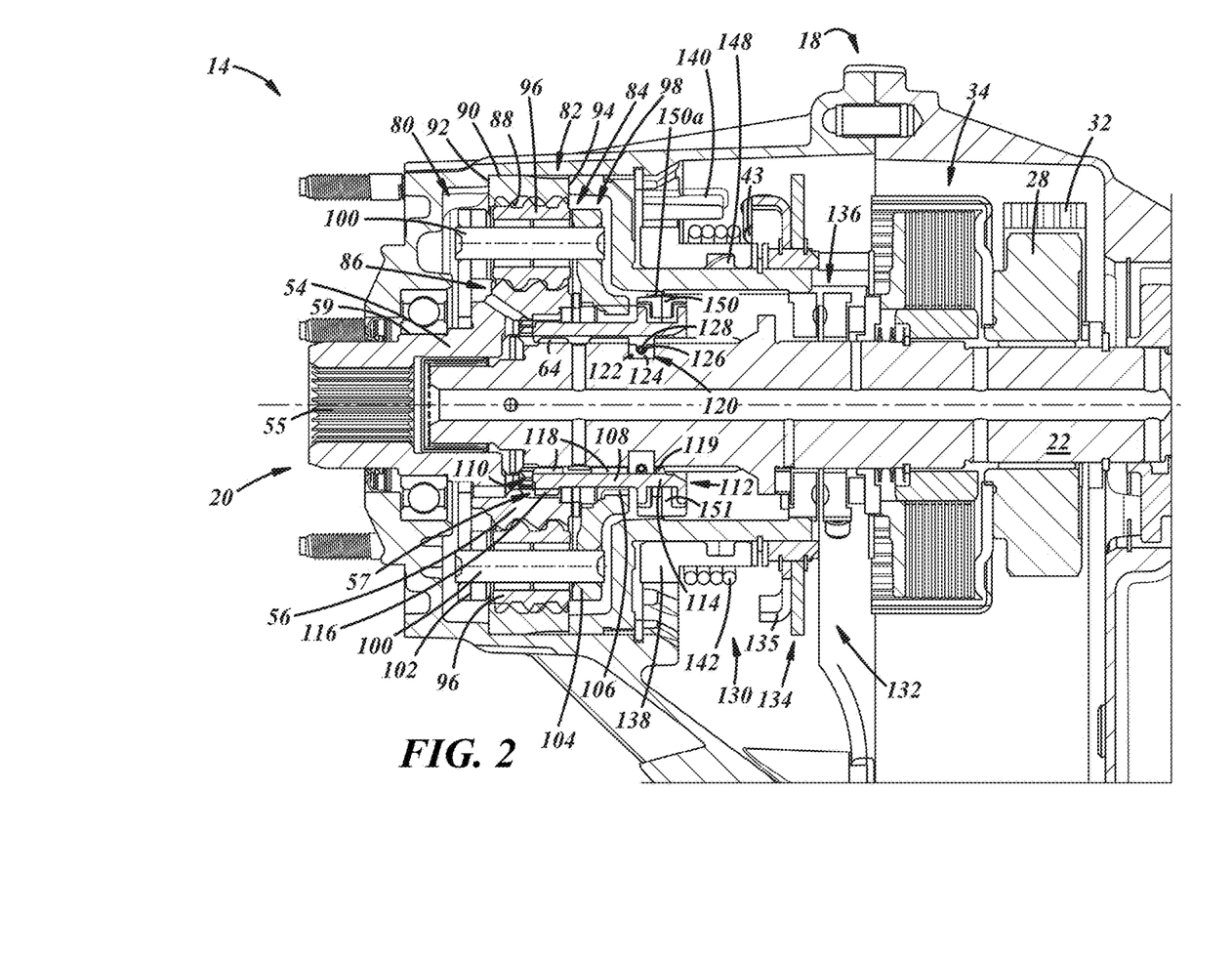
FIG. 2 is an enlarged, fragmentary, cross-sectional view of a portion of the transfer case of FIG. 1.

With reference to FIGS. 1 and 2, the input 20 may include, in the illustrated embodiment, an integrated input hub 54 and sun gear 56. But in other embodiments, the input 20 may include an input shaft, an input plate, an input ring, and/or any other component(s) suitable to carry torque output received by the transfer case 14 from the transmission 12. In the illustrated example, the input 20 includes an internal spline 55 in the hub 54 at a first end, and an internal spline 57 in the sun gear 56 at a second end. In other embodiments, although not shown, the input 20 could include an external spline at the first end, lugs at the second end, or any other suitable arrangement of connection features. In any case, the input 20 may include an internal bearing journal 58 located intermediate the first and second ends and that may be an internal feature to support the output 22, and an external bearing journal 59 located between the spline 55 and the sun gear 56.

Likewise, with reference to FIG. 1, the output 22 may include, in the illustrated embodiment, an output shaft. But in other embodiments, the output 22 may include an output hub and flange, or any other component(s) suitable to carry torque out of the transfer case 14 to a downstream drivetrain element, for example, a driveshaft and/or the axle 16. In the illustrated embodiment, the output 22 includes a bearing journal 60 that is located at a first end of the output 22 and is an external feature, for cooperation with the corresponding bearing journal 58 of the input 20 via a bushing or bearing. The output 22 also may include an output spline 62 at a second end, a planetary spline 64 proximate the first end and the bearing journal 60, and a pump journal and spline portion 66. The output 22 further may include a sprocket journal 68 inboard of the pump journal and spline portion 66, a clutch spline and journal portion 70 inboard of the sprocket journal 68, and another bearing journal 72 proximate the pump assembly 26. Also, the output 22 may include a main oil passage 74 extending axially into the first end of the output 22, and various transverse oil passages 76, 78.

With reference to FIG. 2, the transfer case 14 also includes a planetary gear set 80 operatively coupled between the input 20 and the output 22 of the transfer case 14. The gear set 80 includes a ring gear 82 that may be connected or grounded to the housing 18, a pinion assembly 84 that may be selectively connectable to the output 22 in a four-wheel-drive low range mode of the transfer case 14, and the sun gear 56 that is selectively connectable with the output 22 in a two-wheel drive mode and in a four-wheel-drive high range mode of the transfer case 14.

The ring gear 82 may include gear teeth 88, an external spline 90, and axially facing shoulders 92, 94. One of the shoulders 92 may be located against a corresponding shoulder of the housing 18. The ring gear 82 may be grounded to the housing 18 via the spline 90 engaged to a corresponding internal spline of the housing 18.

The pinion assembly 84 includes pinion gears 96 having teeth in mesh with teeth of the ring gear 82 and the sun gear 56, and a carrier 98 to carry the pinion gears 96. The pinion assembly 84 also may include pinion shafts 100 to couple the pinion gears 96 to the carrier 98, and also may include needle bearings between the pinion shafts 100 and the pinion gears 96 and washers between the pinion gears 96 and the carrier 98. In one example, the assembly 84 may include six of the pinion gears 96, or three, or four, or any other suitable quantity of the pinion gears 96. The carrier 98 may include first and second plates 102, 104 that may be coupled together via the pinion shafts 100, and also may be coupled via plate extensions (not shown) extending axially between the plates 102, 104. The carrier 98 may be splined. For instance, the carrier 98 may include an internal spline 106, for example, on a hub portion of the second plate 104.

The sun gear 56 may include external gear teeth in mesh with the gear teeth of the pinion gears 96, and the internal spline 57, which will be discussed in greater detail below. In the illustrated embodiment, the sun gear 56 is an integral portion of the input 20. But in other embodiments, the sun gear 56 may be a separate component that may be welded, splined, or otherwise coupled to the rest of the input 20.

With continued reference to FIG. 2, the transfer case 14 also may include a reduction hub or shift sleeve 108 to selectively couple and uncouple portions of the transfer case 14. For example, in the illustrated embodiment, the shift sleeve 108 may selectively couple and uncouple portions of the planetary gear set 80 to the output 22. In other embodiments, the shift sleeve 108 may selectively couple and uncouple portions of a planetary gear set to one another, or to any other suitable transfer case components. Also, in the illustrated embodiment, the shift sleeve 108 may be axially slidably carried along and non-rotatably coupled to the output 22. In other embodiments, the shift sleeve 108 may be axially slidably carried along and non-rotatably coupled to a sun gear, or any other suitable transfer case component(s).

In any case, in the illustrated embodiment, the shift sleeve 108 may be selectively connectable with the sun gear 56 to couple the sun gear 56 and the output 22 to render the sun gear 56 nonrotatable with respect to the output 22 in a high range configuration. Likewise, the shift sleeve 108 may be selectively connectable with the carrier 98 to couple the carrier 98 and the output 22 to render the carrier 98 nonrotatable with respect to the output 22 in a low range configuration. Additionally, the shift sleeve 108 may be selectively disengageable with both the sun gear 56 and the carrier 98 in an intermediate position to render the sun gear 56 and the carrier 98 rotatable with respect to the output 22 in a neutral range configuration. The shift sleeve 108 may include a first end 110, a second end 112 axially opposite the first end 110, and a shift coupling portion 114 at the second end. Also, the shift sleeve 108 may be splined. For example, the shift sleeve 108 may include an external spline 116 that may be located at the first end 110, and an internal spline 118 for slidable but non-rotatable connection to the external spline of the output 22. In the illustrated embodiment, the shift sleeve 108 may be moved by a dual range/mode shifter as will be described in further detail herein below. But in other embodiments, the shift sleeve 108 may be moved by a conventional shifter including a conventional shift fork, shift fork linkages, and one or more actuators/motors.

In any case, the transfer case 14 includes a blocker or lock 120 operable to engage the shift sleeve 108 to prevent axial movement of the shift sleeve 108. The lock 120 prevents the transfer case 14 from undergoing a range shift in an undesirable situation, for example, when the transfer case 14 is operating above a predetermined rotational speed, for instance, of the output 22, that may correspond to a predetermined speed of a vehicle in which the transfer case 14 is used. The predetermined rotational speed may between 400 and 5,000 RPM, including all ranges and sub-ranges therebetween, and the corresponding vehicle speed may be between 10 and 120 MPH, including all ranges and sub-ranges therebetween. As set forth in a detailed example below, the vehicle speed may be 30 MPH. Accordingly, the lock 120 enables a speed-responsive mechanical range lock for the transfer case 14.

In the illustrated embodiment, the lock 120 may be carried in a relief 122 in the output 22. For example, in the illustrated embodiment, the relief 122 may include an annular groove in an outer diameter of the output 22. In other embodiments, the relief 122 may be a space between radially outward portions of the output 22. In still other embodiments, the relief 122 may be in another component, for instance, a sun gear, which may carry a shift sleeve.

With reference to FIG. 2, for demonstration purposes, the lock 120 is illustrated in a home or retracted position above the axis A but in an actuated or advanced position below the axis A. In the illustrated embodiment, the lock 120 is operable to engage at least a portion of the shift sleeve 108, for example, an axially rearwardly facing shoulder of the internal spline 118 and/or an axially forwardly facing shoulder of a radially inwardly extending projection 119 of the shift sleeve 108. In the illustrated embodiment, the projection 119 may be a continuation of the internal spline 118. In other embodiments, the projection 119 may be an annulus, reduced diameter portion, snap ring, or any other suitable feature(s) of the shift sleeve 108 or carried by the shift sleeve 108.

The lock 120 is passively or automatically engageable with the shift sleeve 108 responsive to the transfer case output shaft exceeding a predetermined rotational speed, to prevent axial movement of the shift sleeve 120 above that speed.

With reference to FIGS. 2 and 3, the lock 120 may include a plurality of shoes 124 and at least one yieldable restraint 126 to yieldably restrain the shoes 124. In the illustrated embodiment, the shoes 124 may include two semi-annular or semi-cylindrical shoes that may have circumferentially extending grooves 128 in radially outer surfaces thereof. Also, in the illustrated embodiment, the restraint 126 may be carried in the grooves 128 and may include a resilient flexible component, for instance, an elastomeric ring, a metal spring that may include a circumferentially continuous tension coil spring, or any other suitable component that imposes a radially inward force on the shoes 124 that tends to bias the shoes 124 into the relief 122 (FIG. 2). In other embodiments, the shoes 124 may include pins, plates, balls, or any other mechanism suitable to engage a sleeve centrifugally after overcoming a retentive force, to limit axial movement of the sleeve.

With reference to FIGS. 1A and 2, the transfer case 14 may include a range shifter 130, a mode shifter 132, and a dual shift actuation arrangement including a driven gear 134 drivable by the shift actuator 38 (FIG. 1A) to actuate the range shifter 130 and to actuate the mode shifter 132. The shifters 130, 132 and driven gear 134 may be like that described in co-pending U.S. Patent Application Publication 2015/0158383, which is assigned to the assignee hereof and is hereby incorporated by reference in its entirety. The mode shifter 132 may include a clutch actuator 136 movable between a retracted position and an advanced position to engage the clutch 34. The ECU 41 (FIG. 1A) may control actuation of the reversible electric motor 40 for driving the driven gear 134, and the sensor 43 may sense the position of the driven gear 134, for instance, via circumferentially extending and spaced apart sectors 135 of the gear 134.

The range shifter 130 and the mode shifter 132 may be located along the longitudinal axis A and positioned longitudinally adjacent to one another. The driven gear 134 may be located coaxially with respect to the longitudinal axis A and interposed between the range shifter 130 and the mode shifter 132. The driven gear 134 actuates the range shifter 130 during a first portion of angular rotation of the gear 134, and actuates the mode shifter 132 during a second portion of angular rotation of the gear 134.

The driven gear 134 may be a single cast component like that shown in FIG. 1A, or may be a multi-piece stamped/machined component like that shown in FIG. 2. In any case, the driven gear 134 rotates a cam 138 of the range shifter 130 that converts rotational motion to translational motion to actuate the range shifter 130 during the first portion of angular rotation of the gear 134. The cam 138 may be a barrel cam indirectly coupled to the driven gear 134, via a lost-motion coupling, in response to rotation of the driven gear 134. For example, in the illustrated embodiment, the barrel cam 138 includes a barrel tab 140 extending axially toward the driven gear 134, the driven gear 134 includes a driven gear tab 134a (FIG. 1A) extending axially toward the range shifter 130 and radially spaced from the barrel cam 138, and a spring 142 rotationally coupled to and between the barrel cam 138 and the driven gear 134 to bias the barrel cam 138 to follow rotational movement of the driven gear 134. The driven gear tab 134a (FIG. 1A) and the barrel tab 140 rotate independently with respect to one another, such that a driving force is loaded into the spring 142 by rotational movement of the driven gear tab 134a (FIG. 1A) in either rotational direction and the rotational driving force is transferred through the spring 142 to the barrel tab 140 to urge rotation of the barrel cam 138 to follow the rotational direction of movement of the driven gear 134.

The spring 142 may be a torsional wrap spring extending around an outer circumference of the barrel cam 138 and having ends coupled to the tabs 134a (FIG. 1A), 140. The spring 142 allows completion of range shift movement if such movement is temporarily blocked due to unmeshed gear teeth engagement during axial movement. In other words, the spring 142 provides passive recovery in the event of a gear tooth block condition. When loaded with force, the wrap spring 142 continually biases the barrel cam 138 in the desired direction of movement until the range shift movement or clutch actuation movement is completed. The wrap spring 142 urges the barrel tab 140 and the driven gear tab 134a (FIG. 1A) into radial alignment with one another after completion of rotational driving movement.

The barrel cam 138 may include one or more cam grooves 148 extending circumferentially and axially along an interior surface of the barrel cam 138. Suitable thrust washers and rings 144-146 may be axially interposed between the barrel cam 138 and the driven gear 134.

A shift fork 150 may be driven to move in guided travel along the cam grooves 148 in an axial direction in response to rotation of the barrel cam 138 by the driven gear 134 to actuate the range shift function between a low-range drive mode and a high-range drive mode of operation. In the illustrated embodiment, for example, the shift fork 150 may be operably engageable with the barrel cam 138 through a shift collar 152, which may be grounded to the housing 18. The barrel cam 138 may be rotatably biased toward the desired rotational movement by the wrap spring 142, even if axial movement of the shift fork 150 is temporarily blocked, while the driven gear 134 continues to rotate. When axial movement of the shift sleeve 108 is blocked during rotation of the barrel cam 138, the wrap spring 142 may be loaded with rotational energy to bias the barrel cam 138 to move rotationally in a desired direction when the blocked condition ceases. The wrap spring 142 may store energy between the electric motor 40 and the shift fork 150 until the desired range mode shift is completed.

The driven gear 134 may actuate the range shifter 130 through rotational movement of the driven gear tab 134a (FIG. 1A) located on a side facing the range shifter 130. The geartrain 48 may include the input gear 49a driven by the electric motor 40. The geartrain 48 may further include the intermediate gear 49b. The barrel cam 138 may be rotatable through an arc of less than 130 degrees in response to rotation of the driven gear 134 in either rotational direction.

The shift collar 152 (FIG. 2) includes axially extending grooves (not shown) allowing passage of cam followers 150a of the shift fork 150 radially into engagement within the cam groove 148 of the barrel cam 138 for driving axial travel of the shift fork 150 in response to rotation of the barrel cam 138. The shift collar 152 (FIG. 2) allows guided axial movement of the shift fork 150, while preventing rotational movement of the shift fork 150. The shift collar 152 (FIG. 2) allows the shift fork 150 to slide in an axial direction to drive the shift sleeve 108 in response to shifting rotational movement of the barrel cam 138 between a low-range angular position and a high-range angular position.

The shift fork 150 may act as a cam follower traveling within the cam groove 148 of the barrel cam 138 as the barrel cam 138 is rotated in either rotational direction. The shift sleeve 108 may include a groove 114 engageable with a radially inward projection 151 of the shift fork 150 allowing rotation of the shift sleeve 108 relative to the shift fork 150. The shift fork 150 supports the shift sleeve 108 for rotation and axial movement through engagement of the shift fork 150 within the groove 114 of the shift sleeve 108.

In operation, with reference to FIG. 2, the shift sleeve 108 may be driven by the shift fork 150 when adjusting the transfer case 14 from one mode to another. For example, the shift sleeve 108 may be in a first position, as illustrated, in the 2WD mode and in the 4WD high range mode, and may be shifted to a second position, although not illustrated, in a 4WD low range mode, and vice-versa. In the first position, the sun gear 56 is selectively connected to the output 22 in the two-wheel drive mode and in the four-wheel-drive high range mode. In the second position, the carrier is selectively connected to the output 22 in the four-wheel drive low range mode. In the first position and/or the second position, when a rotational speed, for instance, of the output 22, exceeds a predetermined speed, the shoes 124 will advance radially outwardly under centrifugal force against the bias force offered by the restraint 126. Accordingly, the shoes 124 will engage corresponding features of the shift sleeve 108 to axially restrain the shift sleeve 108 and thereby maintain the transfer case 14 in its present shift range configuration.

Additionally, with reference to FIGS. 1A and 2, the driven gear 134 actuates the mode shifter 132 during the second portion of angular rotation of the gear 134. The driven gear 134 may include a collar 154 to support the clutch actuator 136. The collar 154 extends axially and semi-circumferentially with circumferential spaces located opposite the range shifter 130 to define circumferentially facing shoulders 156.

In the illustrated embodiment, the clutch actuator 136 includes a ball cam assembly, including a base cam 158, a clutch actuating cam 160 rotatable in response to rotation of the driven gear 134, and a plurality of cam balls (not shown) carried therebetween in pockets and cam ramps. The clutch actuating cam 160 may move axially toward and away from the clutch 34 (FIG. 2) for engaging and disengaging the clutch 34. The clutch actuating cam 160 may include a plurality of followers 162 for engagement with shoulders 156 of the collar 154. The plurality of followers 162 may allow axial movement of the clutch actuating cam 160 with respect to the base cam 158 while providing a free floating movement between the clutch actuating cam 160 and the driven gear 134. The plurality of followers 162 may be rollers rotatably fastened to bosses 163 of the cam 160. A retaining plate 164 may engage with the axially extending collar 154 of the driven gear 134 for enclosing the cams 158, 160 and limiting axial travel of the clutch actuating cam 160. The retaining plate 164 may be connected to the axially extending collar 154 of the driven gear 134 with a plurality of fasteners 166. In other embodiments, the clutch actuator 136 may include a screw drive, or any other arrangement suitable to convert rotational motion into translation motion sufficient to actuate a clutch.

The transfer case 14 may exclude various components previously required in prior art transfer cases. For example, the transfer case 14 may exclude costly sensors, electronics, and/or software that may be used in an effort to prevent inadvertent shifting of the transfer case out the high range mode at high speeds. More specifically, the transfer case 14 may exclude speed-responsive electronic range locks.

Below, an example centrifugal lockout speed calculation is provided for an example garter spring that may be used as the restraint 126. In a specific example, the garter spring may be supplied by Associated Spring Raymond (www.asraymond.com) and, more specifically, may be part number G050-01100492-S and may be composed of 302 stainless steel ASTM-A313 (C & P).

First, example parameters and parameter values of an example shoe are provided below.

$$\rho_{steel} := 7700 \cdot \frac{\text{kg}}{\text{m}^3}$$

$$ID_{shoe} := 36 \cdot \text{mm}$$

$$OD_{shoe} := 47 \cdot \text{mm}$$

$$L_{shoe} := 10 \cdot \text{mm}$$

$$D_{springinstalled} := 43 \cdot \text{mm}$$

$$L_{Groove} = 4 \cdot \text{mm}$$

$$R_{Groove} := 2 \cdot \text{mm}$$

$$D_{Groove} := 44 \cdot \text{mm}$$

Second, the mass of the example shoe is calculated, as follows.

$$V_{oneshoe} := \frac{\left[\left[L_{shoe} \cdot \left(\frac{OD_{shoe} - ID_{shoe}}{2}\right) - \pi \cdot R_{Groove}^2\right] \cdot \pi \cdot \frac{(OD_{shoe} + ID_{shoe})}{2}\right]}{2}$$

$$V_{oneshoe} = 2.766 \times 10^3 \text{ mm}^3$$

$$M_{oneshoe} := V_{oneshoe} \cdot \rho_{steel}$$

$$M_{oneshoe} = 0.021 \text{ kg}$$

Third, example vehicle parameters are provided below.

$$\text{Rev}_{mi} := 660$$

$$R_{tire} := \frac{1 \cdot \text{mi}}{\text{Rev}_{mi} \cdot \pi \cdot 2}$$

$$R_{tire} = 388.083 \text{ mm}$$

$$\text{Ratio}_{axle} := 3.73$$

$$i := 0, 1 \ldots 120$$

$$\text{Vehicle}_{speed_i} := i \cdot \text{mph}$$

Figure 4:
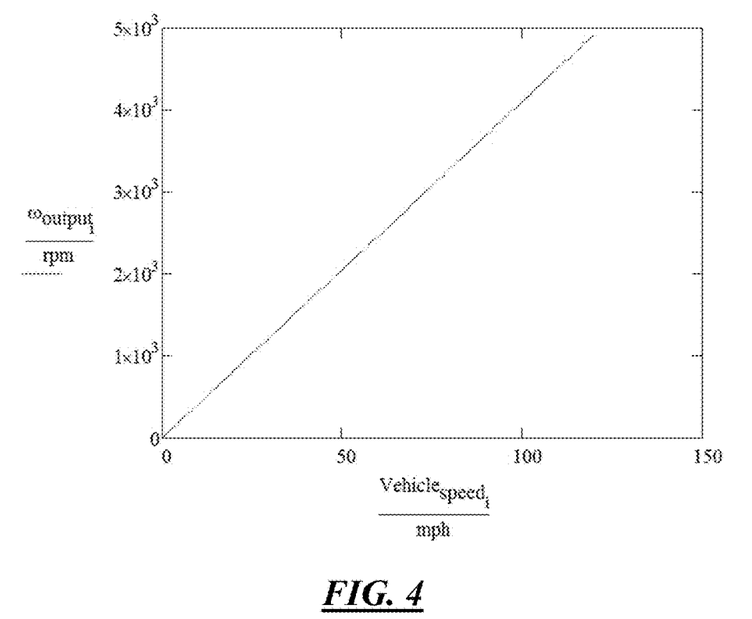
FIG. 4 is a graph of propshaft speed vs. vehicle speed.

Fourth, the speed of the output shaft is calculated based on the equation below and using the graph in FIG. 4 of propshaft speed vs. vehicle speed, as follows.

$$\omega_{output_i} := \frac{\text{Vechile}_{speed_i}}{\left(\frac{2 \cdot \pi \cdot R_{tire}}{\text{rev}}\right)} \cdot \text{Ratio}_{axle}$$

Figure 5:
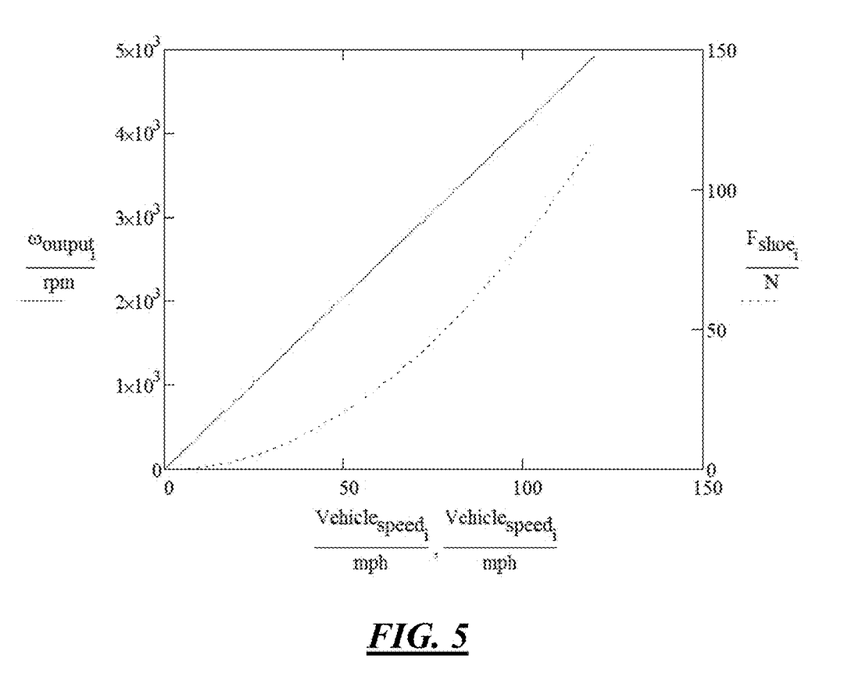
FIG. 5 is a graph of vehicle speed vs. propshaft speed and vs. centrifugal force.

Fifth, the centrifugal force on one shoe is calculated based on the equation below and using the graph in FIG. 5 of vehicle speed vs. propshaft speed and vs. centrifugal force.

$$F_{shoe} := \omega_{output}^2 \cdot M_{oneshoe} \cdot \frac{(OD_{shoe} + ID_{shoe})}{4}$$

From the above information, and knowing that the nominal load of the installed garter spring is 6.75 N, one can determine that the lock would engage the shift sleeve when the vehicle speed is 30 MPH (wherein the actual centrifugal force on the shoe is 7.343 N, which is greater than the spring force of 6.75 N). Those of ordinary skill in the art will recognize that less spring force and/or more shoe mass would permit engagement at a lower speed.

The foregoing description is considered illustrative only. The terminology that is used is intended to be in the nature of words of description rather than of limitation. Many modifications and variations will readily occur to those skilled in the art in view of the description. Thus, the foregoing description is not intended to limit the invention to the embodiments described above. Accordingly the scope of the invention as defined by the appended claims.

What is claimed is:

1. A motor vehicle transfer case, comprising:
an input rotatable about an axis to receive torque;
an output rotatable about the axis to transmit torque;
a planetary gear set rotatable about the axis and operatively coupled between the input and the output;
a shift sleeve circumscribing and axially slidably carried along the axis; and
a shift sleeve lock automatically engageable with the shift sleeve responsive to the transfer case exceeding a predetermined rotational speed, and radially outwardly movable to prevent axial movement of the shift sleeve above that speed.

2. The transfer case of claim 1, wherein the lock is centrifugally actuated.

3. The transfer case of claim 2, wherein the lock includes at least two shoes and a yieldable restraint to yieldably restrain the shoes in a home position.

4. A motor vehicle transfer case, comprising:
an input rotatable about an axis to receive torque;
an output rotatable about the axis to transmit torque;
a planetary gear set rotatable about the axis and operatively coupled between the input and the output;
a shift sleeve circumscribing and axially slidably carried along the axis; and
a shift sleeve lock automatically engageable with the shift sleeve responsive to the transfer case exceeding a predetermined rotational speed, to prevent axial movement of the shift sleeve above that speed,
wherein the lock is centrifugally actuated and includes at least two shoes and a yieldable restraint to yieldably restrain the shoes in a home position, and
wherein the shoes include semi-circular shoes and a garter spring circumscribing the shoes.

5. A motor vehicle transfer case, comprising:
an input rotatable about an axis to receive torque;
an output rotatable about the axis to transmit torque;
a planetary gear set rotatable about the axis and operatively coupled between the input and the output;
a shift sleeve circumscribing and axially slidably carried along the axis; and
a shift sleeve lock automatically engageable with the shift sleeve responsive to the transfer case exceeding a predetermined rotational speed, to prevent axial movement of the shift sleeve above that speed,
wherein the output includes an external surface and a groove in the external surface carrying the lock.

6. The transfer case of claim 5, wherein the lock includes at least two semi-circular shoes disposed in the groove, and a spring circumscribing the shoes to compress the shoes in a radially inward direction.

7. The transfer case of claim 1, wherein the shift sleeve is carried on a portion of the output to couple the output to different portions of the planetary gear set to achieve different speed ranges.

8. The transfer case of claim 7, wherein the planetary gear set includes:
a sun gear connected to the input and selectively connectable with the output to rotate with the output in a two-wheel drive mode and in a four-wheel-drive high range mode,
a pinion assembly including pinion gears in mesh with the sun gear and a carrier to carry the pinion gears and selectively connectable with the output to rotate with the output in a four-wheel drive low range mode, and
a ring gear in mesh with the pinion gears, and grounded against rotation.

9. A motor vehicle transfer case, comprising:
an input rotatable about an axis to receive torque;
an output rotatable about the axis to transmit torque;
a planetary gear set rotatable about the axis and operatively coupled between the input and the output,
wherein the planetary gear set includes:
a sun gear connected to the input and selectively connectable with the output to rotate with the output in a two-wheel drive mode and in a four-wheel-drive high range mode,
a pinion assembly including pinion gears in mesh with the sun gear and a carrier to carry the pinion gears and selectively connectable with the output to rotate with the output in a four-wheel drive low range mode, and
a ring gear in mesh with the pinion gears, and grounded against rotation;
a shift sleeve circumscribing and axially slidably carried along the axis on a portion of the output to couple the output to different portions of the planetary gear set to achieve different speed ranges; and
a shift sleeve lock automatically engageable with the shift sleeve responsive to the transfer case exceeding a predetermined rotational speed, to prevent axial movement of the shift sleeve above that speed,
wherein the shift sleeve is axially slidably carried on and non-rotatably coupled to the output, and selectively connectable with the sun gear to render the sun gear non-rotatable with respect to the output, and selectively connectable with the carrier to render the sun gear rotatable with respect to the output and render the carrier non-rotatable with respect to the output and rotatable around the sun gear.

10. The transfer case of claim 9, wherein the shift sleeve is not simultaneously connectable to both the sun gear and the carrier.

11. A motor vehicle transfer case, comprising:
an input rotatable about an axis to receive torque;
an output rotatable about the axis to transmit torque;
a planetary gear set rotatable about the axis and operatively coupled between the input and the output;
a shift sleeve circumscribing and axially slidably carried along the axis; and
a shift sleeve lock automatically engageable with the shift sleeve responsive to the transfer case exceeding a predetermined rotational speed, to prevent axial movement of the shift sleeve above that speed,
wherein the output includes an external spline, and the shift sleeve includes an internal spline slidably splined to the output external spline, and an external spline selectively connectable to the different portions of the planetary gear set.

12. The transfer case of claim 11, wherein the lock is carried radially inwardly with respect to the shift sleeve and the shift sleeve has at least one shoulder extending radially inwardly.

13. The transfer case of claim 12, wherein the at least one shoulder includes two shoulders adjacent an axial space between portions of the internal spline.

14. A method of operating a transfer case, comprising the steps of:
moving a range shift sleeve to a range position coupling one rotatable component to another rotatable component; and
allowing a shift sleeve lock to move radially outwardly to prevent axial movement of the moved range shift sleeve, responsive to a rotational speed of the transfer case exceeding a predetermined speed.

15. The method of claim 14, wherein the shift sleeve lock moves radially outwardly under centrifugal force of a rotational component on which the lock is carried.

* * * * *